United States Patent
Yedid et al.

(10) Patent No.: US 12,547,055 B2
(45) Date of Patent: Feb. 10, 2026

(54) ACTUATORS FOR PROVIDING AN EXTENDED TWO-DEGREE OF FREEDOM ROTATION RANGE

(71) Applicant: Corephotonics Ltd., Tel Aviv (IL)

(72) Inventors: Itay Yedid, Tel Aviv (IL); Ephraim Goldenberg, Tel Aviv (IL); Yiftah Kowal, Tel Aviv (IL); Daniel Boltinsky, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/408,638

(22) Filed: Jan. 10, 2024

(65) Prior Publication Data

US 2024/0210798 A1 Jun. 27, 2024

Related U.S. Application Data

(63) Continuation of application No. 17/776,427, filed as application No. PCT/IB2020/061333 on Dec. 1, 2020, now abandoned.

(Continued)

(51) Int. Cl.
*G03B 17/17* (2021.01)
*G02B 7/18* (2021.01)
(Continued)

(52) U.S. Cl.
CPC ........... *G03B 17/17* (2013.01); *G02B 7/1805* (2013.01); *G02B 7/1827* (2013.01);
(Continued)

(58) Field of Classification Search
CPC ............... G02B 27/646; G02B 7/1828; G02B 13/0065; G02B 26/0816; G02B 7/1805; G03B 17/17; G03B 30/00
See application file for complete search history.

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Zitova bet al: "Image Registration Methods: a Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.

(Continued)

*Primary Examiner* — Cara E Rakowski
(74) *Attorney, Agent, or Firm* — Nathan & Associates; Menachem Nathan

(57) ABSTRACT

Actuators for providing an extended two-degree of freedom rotation range to an optical path folding element (OPFE) such as a prism or mirror in mobile devices such as smartphones, comprising a yaw sub-assembly having a yaw rotation axis, a pitch sub-assembly carrying the OPFE, the pitch sub-assembly including a pivot rotation mechanism and having a pitch rotation axis; and a stationary sub-assembly, wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

20 Claims, 13 Drawing Sheets

Related U.S. Application Data

(60) Provisional application No. 62/942,913, filed on Dec. 3, 2019.

(51) Int. Cl.
*G02B 7/182* (2021.01)
*G02B 13/00* (2006.01)
*G02B 27/64* (2006.01)
*G03B 30/00* (2021.01)

(52) U.S. Cl.
CPC ....... *G02B 13/0065* (2013.01); *G02B 27/646* (2013.01); *G03B 30/00* (2021.01)

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |

(56) References Cited

U.S. PATENT DOCUMENTS

| | | |
|---|---|---|
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |

(56) References Cited

U.S. PATENT DOCUMENTS

| | | |
|---|---|---|
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0356645 A1* | 12/2018 | Jeong ............ G02B 27/646 |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0129197 A1* | 5/2019 | Kim ............... G02B 27/646 |
| 2019/0130822 A1 | 5/2019 | Jung et al. |
| 2019/0154466 A1 | 5/2019 | Fletcher |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0221026 A1 | 7/2020 | Fridman et al. |
| 2020/0264403 A1 | 8/2020 | Bachar et al. |
| 2020/0363626 A1* | 11/2020 | Seo ................ G03B 30/00 |
| 2020/0389580 A1 | 12/2020 | Kodama et al. |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2022/0252963 A1 | 8/2022 | Shabtay et al. |
| 2022/0368814 A1 | 11/2022 | Topliss et al. |
| 2022/0404683 A1* | 12/2022 | Lee ................ G03B 5/06 |

FOREIGN PATENT DOCUMENTS

| | | |
|---|---|---|
| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 103841404 A | 6/2014 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |
| JP | 2006238325 A | 9/2006 |
| JP | 2008083377 A | 9/2006 |
| JP | 2007228006 A | 9/2007 |
| JP | 2007306282 A | 11/2007 |
| JP | 2008076485 A | 4/2008 |
| JP | 2008245142 A | 10/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |

(56) References Cited

FOREIGN PATENT DOCUMENTS

| | | | |
|---|---|---|---|
| JP | 2013101213 A | 5/2013 | |
| JP | 2013106289 A | 5/2013 | |
| JP | 2016105577 A | 6/2016 | |
| JP | 2017146440 A | 8/2017 | |
| JP | 2019126179 A | 7/2019 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A | 12/2014 | |
| KR | 20150118012 A | 10/2015 | |
| KR | 20170105236 A | 9/2017 | |
| KR | 20180120894 A | 11/2018 | |
| KR | 20130085116 A | 6/2019 | |
| TW | I407177 B | 9/2013 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | 2017025822 A1 | 2/2017 | |
| WO | 2017037688 A1 | 3/2017 | |
| WO | WO-2017208090 A1 * | 12/2017 | ......... G02B 13/0065 |
| WO | 2018130898 A1 | 7/2018 | |
| WO | WO-2019207464 A2 * | 10/2019 | ............. G01D 5/145 |

OTHER PUBLICATIONS

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Extended Search Report in related EP patent application 24214104.2, dated Apr. 14, 2025.

* cited by examiner

KNOWN ART

KNOWN ART

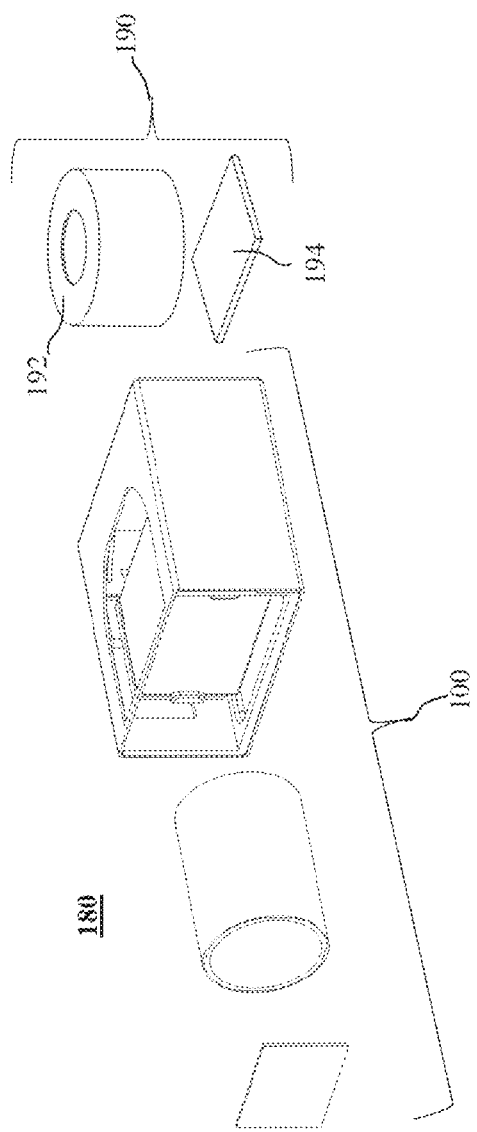
FIG. 1C  KNOWN ART

ACTUATORS FOR PROVIDING AN EXTENDED TWO-DEGREE OF FREEDOM ROTATION RANGE

CROSS-REFERENCE TO RELATED APPLICATIONS

This application is a continuation from U.S. patent application Ser. No. 17/776,427 filed May 12, 2022, which is a 371 application from international patent application PCT/IB2020/061333 filed Dec. 1, 2020, and is related to and claims priority from U.S. Provisional Patent Application No. 62/942,913 filed Dec. 3, 2019, which is expressly incorporated herein by reference in its entirety.

FIELD

The subject matter disclosed herein relates in general to digital cameras and in particular to actuators for yaw and pitch rotation in folded digital cameras included in smartphones.

BACKGROUND

Multi-cameras and folded cameras in electronic handheld devices (e.g. smartphones or tablets) are known. In a folded camera, a reflecting or optical path folding element (OPFE) such as a prism or a mirror and which includes a reflection surface, is added to tilt light propagation from a first optical path (e.g. perpendicular to the smart-phone back surface) to a second optical path (e.g. parallel to the smart-phone back surface).

Co-owned international patent application PCT/IB2019/053315 describes in detail folded cameras comprising an actuator for rotating an OPFE with two, first and second, degrees of freedom in an extended rotation range around two respective rotation axes, and dual-cameras including such a folded camera together with an upright camera.

There is need and it would be beneficial to have folded cameras in which an OPFE carrying module allows for a large extended rotation range around two respective rotation axes, for example for yaw and pitch rotations, supports state-of-the-art industry standards e.g. with respect to drop tests, and has cost low manufacturing compatible with smartphone costs.

SUMMARY

In various embodiments there are provided actuators for providing an extended two-degree of freedom rotation range to an OPFE (e.g. a prism or mirror) in mobile devices such as smartphones, comprising: a yaw sub-assembly having a yaw rotation axis; a pitch sub-assembly carrying the OPFE, the pitch sub-assembly including a pivot rotation mechanism and having a pitch rotation axis; and a stationary sub-assembly, wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

In some embodiments, an actuator as above or below is integrated in a folded camera.

The folded camera may be a scanning Tele camera capable of scanning a scene in the two rotation directions.

In some embodiments, the yaw sub-assembly and the pitch sub-assembly form a master-slave arrangement, wherein the yaw sub-assembly acts as the master and the pitch sub-assembly acts as the slave.

In some embodiments, the pivot rotation mechanism includes a pivot located at two opposite sides of the OPFE and wherein the pitch rotation axis is close to a pitch sub-assembly center of gravity.

In some embodiments, the pivot rotation mechanism includes a ball-guided mechanism.

In some embodiments, the pivot rotation mechanism includes a pitch driving coil and a magnet.

In some embodiments, the pitch driving coil surrounds the yaw rotation axis.

In some embodiments, the yaw sub-assembly includes at least one groove-ball mechanism.

In some embodiments, grooves of the at least one groove-ball mechanism are concentrically curved, with a center of the curvature on the yaw rotation axis.

In some embodiments, balls of the at least one groove-ball mechanism are guided by groove pairs that include each a groove on the yaw sub-assembly and a groove on the stationary sub-assembly.

In some embodiments, the at least one groove-ball mechanism includes at least 3 balls.

In some embodiments, balls of the at least one groove-ball mechanism are located in a plane that is perpendicular to the yaw rotation axis.

In some embodiments, the yaw rotation is sensed by at least one Hall sensor.

In some embodiments, the least one Hall sensor is located beneath the yaw sub-assembly and is fixedly coupled to the stationary sub-assembly.

In some embodiments, the yaw rotation is by an actuation mechanism including a yaw driving coil and a yaw driving magnet.

In some embodiments, the yaw driving magnet is concentrically curved.

In some embodiments, the yaw driving magnet is curved, with a center of curvature close to the yaw rotation axis.

In some embodiments, the yaw driving magnet is fixedly coupled to the yaw sub-assembly and the driving coil is fixedly coupled to the housing.

In some embodiments, the yaw driving magnet has two different magnet polarization directions and wherein the two different polarization directions are perpendicular to the yaw rotation axis.

In some embodiments, the yaw rotation axis is close to a common center of mass of the yaw sub-assembly and the pitch sub-assembly together.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings:

FIG. 1C shows the folded camera of FIG. 1A as part of a dual-camera system;

DETAILED DESCRIPTION

Figure 1B:
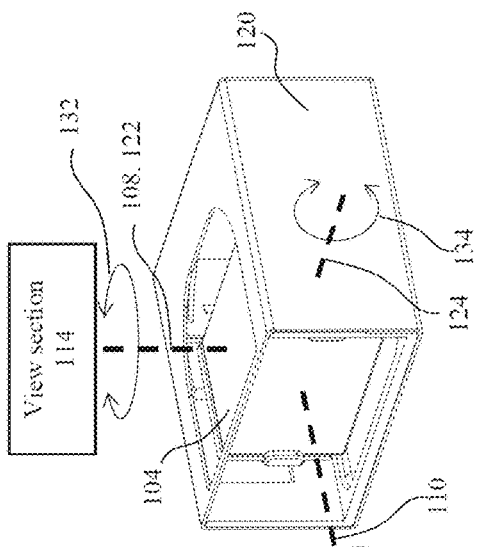
FIG. 1B shows the folded camera of FIG. 1A with an OPFE actuator.
Figure 1A:
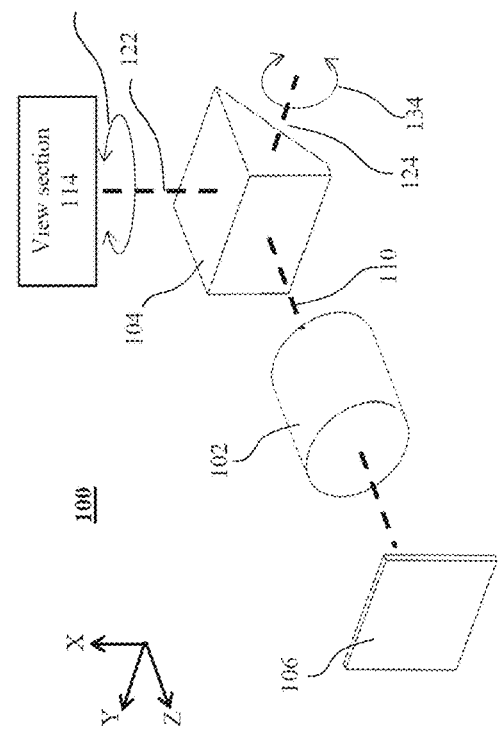
FIG. 1A illustrates a known folded camera with an optical path folding element (OPFE) with an extended 2 degrees-of-freedom (2DOF) rotation range.

FIG. 1A illustrates a folded camera 100 with a 2 degrees-of-freedom (DOF) optical path folding element (OPFE) with an extended rotation range disclosed in PCT/IB2019/053315. The term "extended rotation range" describes a rotation range larger than the 2-3 degrees necessary for another application, for example optical image stabilization (OIS). The extended rotation range may be a range equal to or greater than ±5 degrees, ±10 degrees or even between 15-40 in each degree of freedom (DOF), relative to an OPFE zero (non-rotated) state.

Camera 100 includes a lens 102 with a lens optical axis, an OPFE 104 and an image sensor 106. OPFE 104 has a reflection surface and may be for example a mirror or a prism. OPFE 104 folds light from a first optical path 108 to a second optical path 110. First optical path 108 extends from the direction of a view section 114 (facing an object or scene) towards OPFE 104 and is substantially parallel to the X-axis (in the exemplary coordinate system). Second optical path 110 extends from OPFE 104 towards image sensor 106 and is substantially parallel to the Z-axis (in the exemplary coordinate system). Yaw rotation can be defined as rotation around an axis substantially parallel to the first optical path in the zero OPFE state. Pitch rotation can be defined as rotation around an axis substantially perpendicular to the yaw rotation axis and the lens optical axis.

The rotation of the OPFE can be done for example using OPFE actuator 120, seen in FIG. 1B. 2DOF rotation may be used to describe rotation of the prism around two axes (each axis being a DOF); in camera 100, the degrees of freedom are a yaw rotation 132 around yaw rotation axis 122 which is parallel to first optical path 108 (X-axis) when in zero state as defined above, and a pitch rotation 134 around a pitch rotation axis 124 which is parallel to the Y-axis.

As shown in FIG. 1C, camera 100 may be a part of a dual-camera 180. Dual-camera 180 comprises camera 100 and an upright camera 190. Upright camera 190 includes a lens 192 and an image sensor 194. Cameras 100 and 190 may share some or all of respective fields of view (FOVs).

In the description below, directions are defined with reference to FIG. 1A. "Top" is the direction toward (facing) view section 114. "Bottom" is the opposite direction.

Figure 2A:
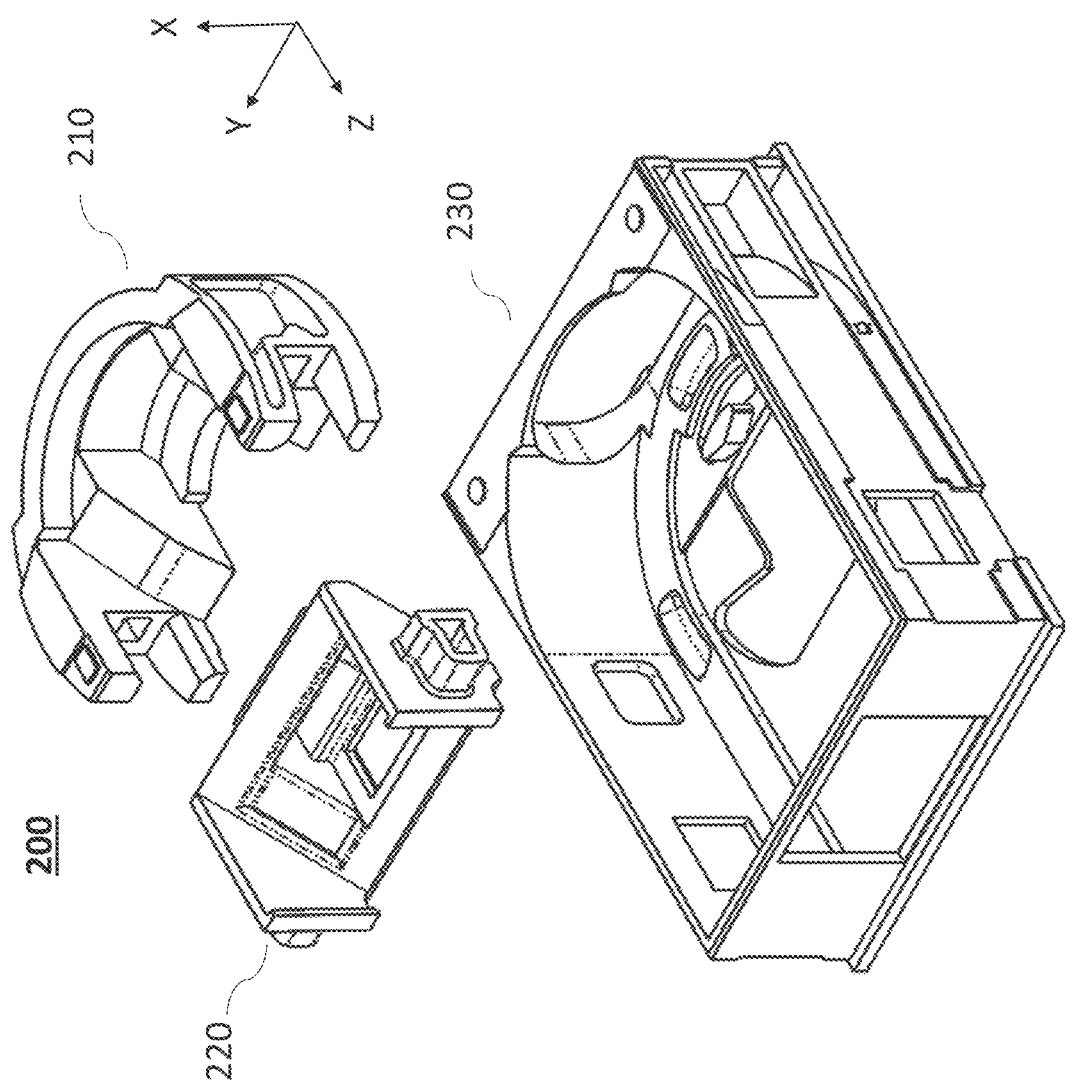
FIG. 2A shows an embodiment of an OPFE actuator disclosed herein in an exploded view.
Figure 2B:
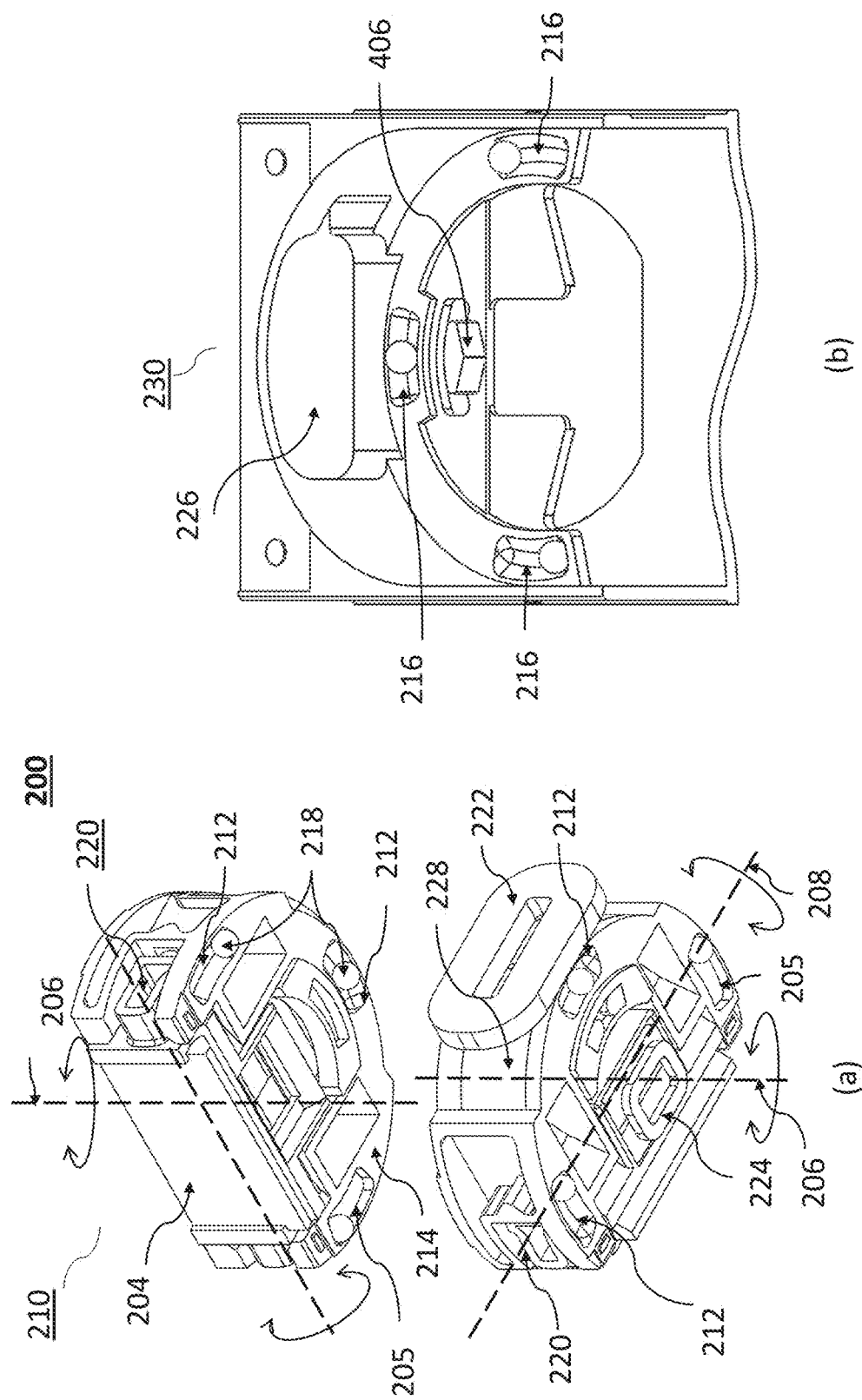
FIG. 2B shows details of the yaw, pitch and stationary sub-assemblies of the OPFE actuator of FIG. 2A.

FIG. 2A shows an embodiment of an OPFE actuator 200 disclosed herein in an exploded view. Actuator 200 comprises a yaw sub-assembly 210, a pitch sub-assembly 220 and a stationary sub-assembly 230. FIG. 2B shows details of each sub-assembly. Yaw and pitch sub-assemblies 210 and 220 are shown in (a) in two different perspective views and stationary sub-assembly 230 is shown in (b) in a perspective view (45 degrees rotated around an axis 208 with respect to top view). Yaw sub-assembly 210 is included in stationary sub-assembly 230 and pitch sub-assembly 220 is included in yaw sub-assembly 220 in a master-slave arrangement. Yaw sub-assembly 210 is "dynamic" i.e. can be rotated around a yaw rotation axis 206 (e.g. parallel to the X-axis), while stationary sub-assembly 230 (as indicated by its name) is stationary i.e. not moving. Pitch sub-assembly 220 is rigidly coupled to an OPFE 204 and is rotatable around a pitch rotation axis 208 (e.g. parallel to the Y-axis) orthogonal to axis 206. When operable to be rotated, yaw sub-assembly 220 rotates OPFE 204 around axis 206 relative to stationary sub-assembly 230 and pitch sub-assembly 220 (and the OPFE attached thereto) rotates around axis 208 relative to the yaw sub-assembly and the stationary sub-assembly. In some embodiments, yaw rotation axis 206 may be close to a center of mass of yaw sub-assembly 210 and pitch sub-assembly 220 together. Close to a center of mass of yaw sub-assembly 210 and pitch sub-assembly 220 together may refer to a distance of e.g. less than 1.5 mm. In other examples, this may refer to a distance of e.g. less than 2 mm or less than 5 mm.

In yet other examples, close to a center of mass of pitch sub-assembly 220 may refer to a distance of e.g. less than 15% of the module height MH. In other examples, this may refer to a distance of e.g. less than 30% or less than 10% of the module height MH. MH is defined in FIG. 2E. The yaw rotation uses one flat surface curved rail 205 and two curved V-grooves 212 formed in a bottom surface 214 of yaw sub-assembly 210 below OPFE 204 (top view in FIG. 2(a)). Rail 205 and curved V-grooves 212 are coupled operationally to three V-grooves 216 and included in stationary sub-assembly 230. This setup of 205, 212 and 216 is known in the art as "tolerance compensation" or "tolerance release". Rail 205 and V-grooves 212 are concentrically curved, wherein the center of the curvature is rotation axis 206. The coupled rail and V-grooves form a groove-ball mechanism for yaw rotation of the OPFE.

In FIG. 2A, balls 218 are shown located within V-grooves 212 and flat surface curved rail 205. The balls may have an exemplary diameter greater than 1.2 mm, compared with 0.8 mm in a standard smartphone camera, allowing for improved drop immunity since their larger diameter provides a larger surface or contact area of balls in the rails and is less sensitive to drops.

OPFE actuator 200 further comprises a yaw driving coil 222 and one pitch driving coil 224, shown in the bottom view in FIG. 2(a). Pitch driving coil 224 surrounds yaw rotation axis 206. Yaw driving coil 222 is positioned in a hole 226 of (and is part of) stationary sub-assembly 230, i.e. is fixedly coupled to stationary sub-assembly 230.

Figure 2C:
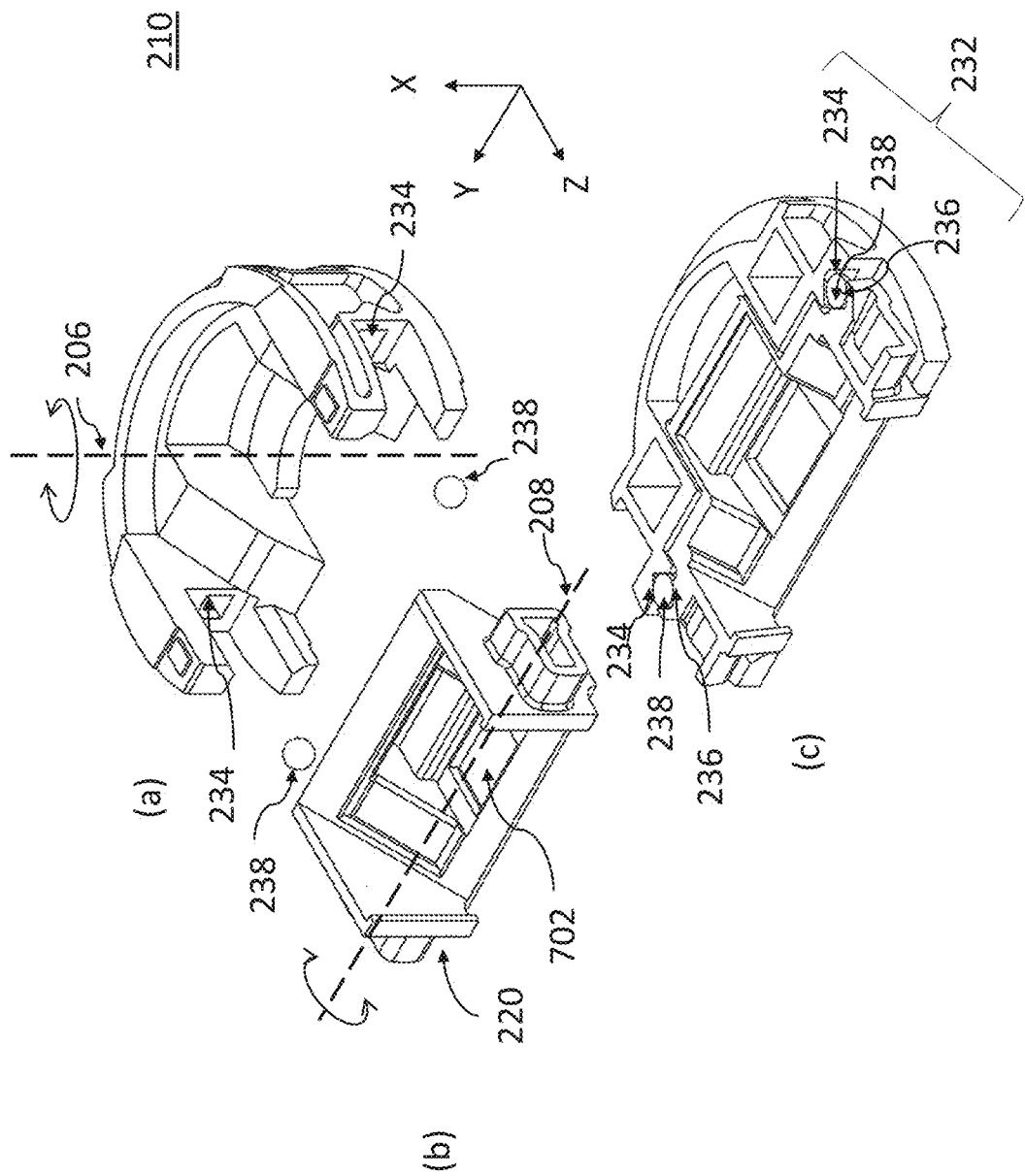
FIG. 2C shows an exploded view of the yaw and pitch sub-assemblies.

FIG. 2C shows an exploded view of the yaw and pitch sub-assemblies, with (a) showing yaw sub-assembly 210 without the pitch sub-assembly, (b) showing pitch sub-assembly 220 and (c) showing a cross section of yaw sub-assembly 210 in a YZ plane.

Figure 2D:
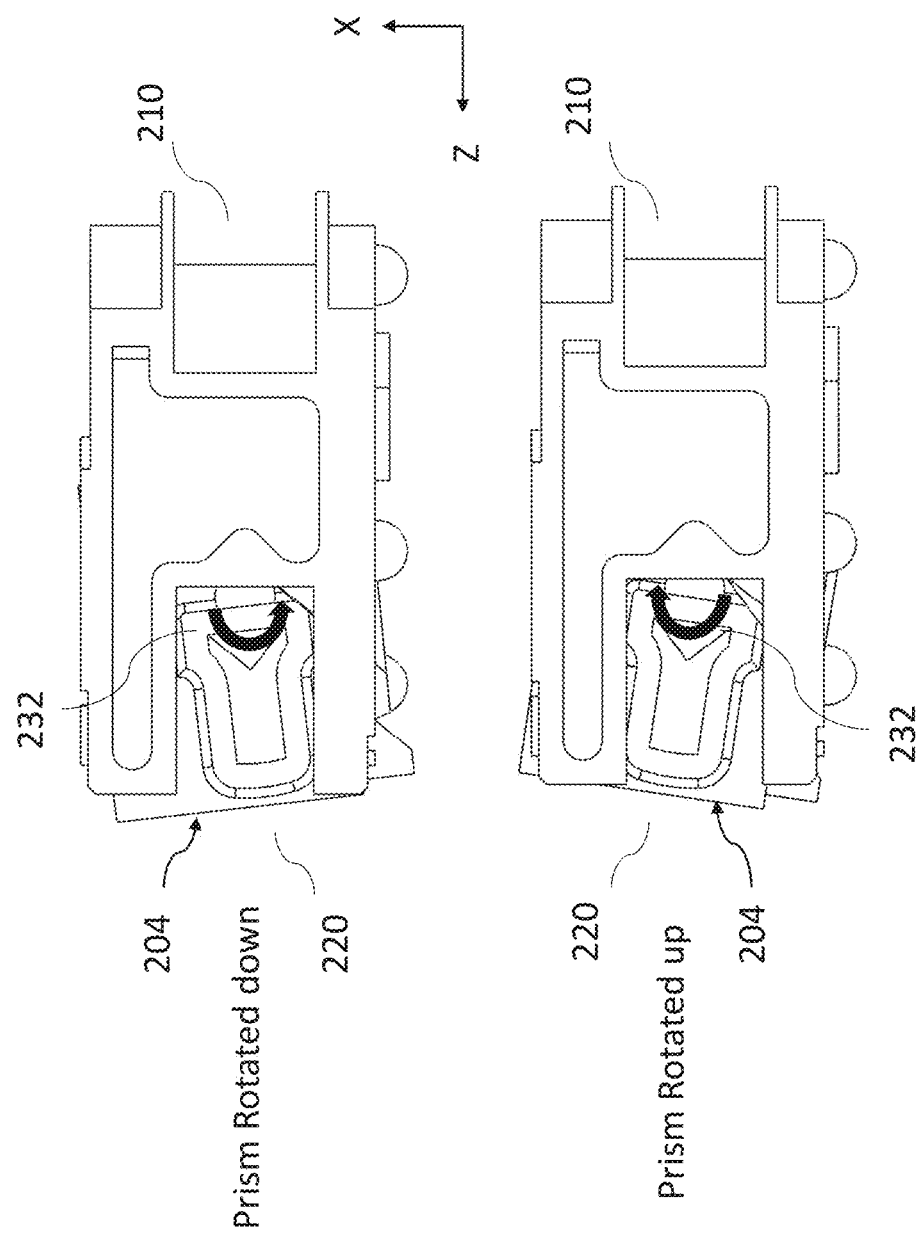
FIG. 2D shows the pitch sub-assembly and the OPFE in two rotated states.

FIG. 2D shows pitch sub-assembly 210 with OPFE 204 in two rotated states, rotated down and rotated up. The pitch rotation around axis 208 is enabled by a pivot rotation mechanism 232 that includes a pivot located at two sides of the OPFE, wherein the rotation axis is close to (and in some cases on) a pitch sub-assembly center of mass. Close to a pitch sub-assembly center of mass may refer to a distance of e.g. less than 1 mm. In other examples, this may refer to a distance of e.g. less than 2 mm or less than 4 mm.

In yet other examples, close to a center of mass of pitch sub-assembly 220 may refer to a distance of e.g. less than 10% of the module height MH. In other examples, this may refer to a distance of e.g. less than 30% or less than 7.5% of the module height MH.

Pivot rotation mechanism 232 is formed by sockets 234 in yaw sub-assembly 210, sockets 236 in pitch sub-assembly 220 and balls 238 fixed in sockets 234 and 236. Like balls 218, balls 238 have an exemplary diameter larger than 1.2 mm, allowing for improved drop immunity since their larger diameter provides a larger surface or contact area and is less sensitive to drops.

Pitch rotation using a pivot ball-guide mechanism contrasts with the rail-based pitch movement in PCT/IB2019/053315. The pivot ball based design disclosed herein is advantageous as of its small size and allows robust manufacturing of the pivot rotation mechanism.

Figure 2E:
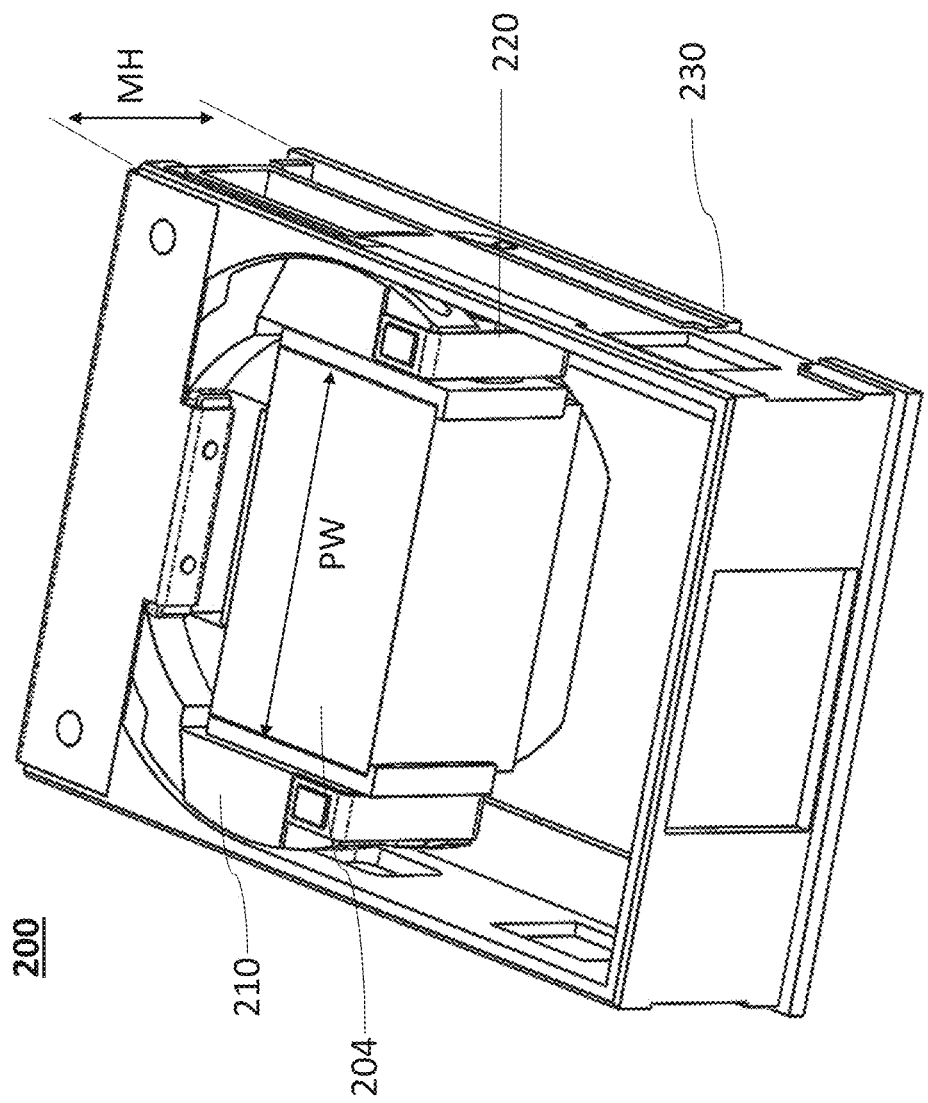
FIG. 2E shows an embodiment of an OPFE actuator disclosed herein in a perspective view.

FIG. 2E shows an embodiment of an OPFE actuator 200 disclosed herein in a perspective view. Actuator 200 comprises a yaw sub-assembly 210, a pitch sub-assembly 220 carrying OPFE 204 and a stationary sub-assembly 230. A module height ("NM") may be 6.0-8.5 mm. A prism width ("PW") may be 60 mm-140 mm.

Figure 3:
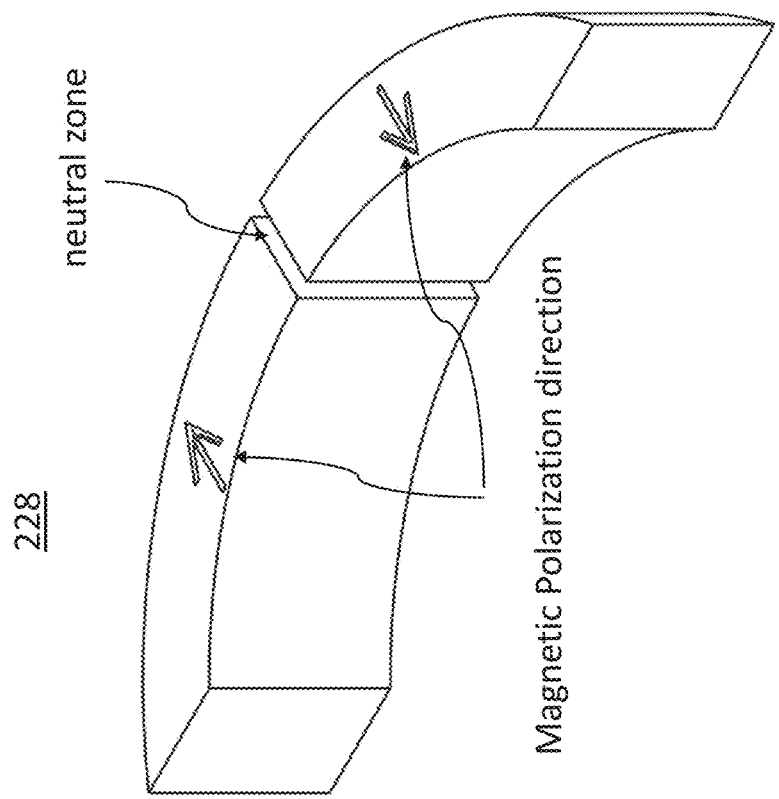
FIG. 3 shows a yaw driving magnet of the OPFE actuator.

OPFE actuator 200 further comprises a yaw driving magnet 228 (FIG. 3) for driving the yaw rotation. Exemplarily and as shown in FIG. 3, yaw driving magnet 228 may be a 4-pole single magnet. In contrast, in PCT/IB2019/053315, the yaw driving magnet has only two poles. The arrows show the magnetic polarization direction. The design disclosed herein is advantageous in that it provides a higher magnetic field leading to a higher actuation force.

Figure 4:
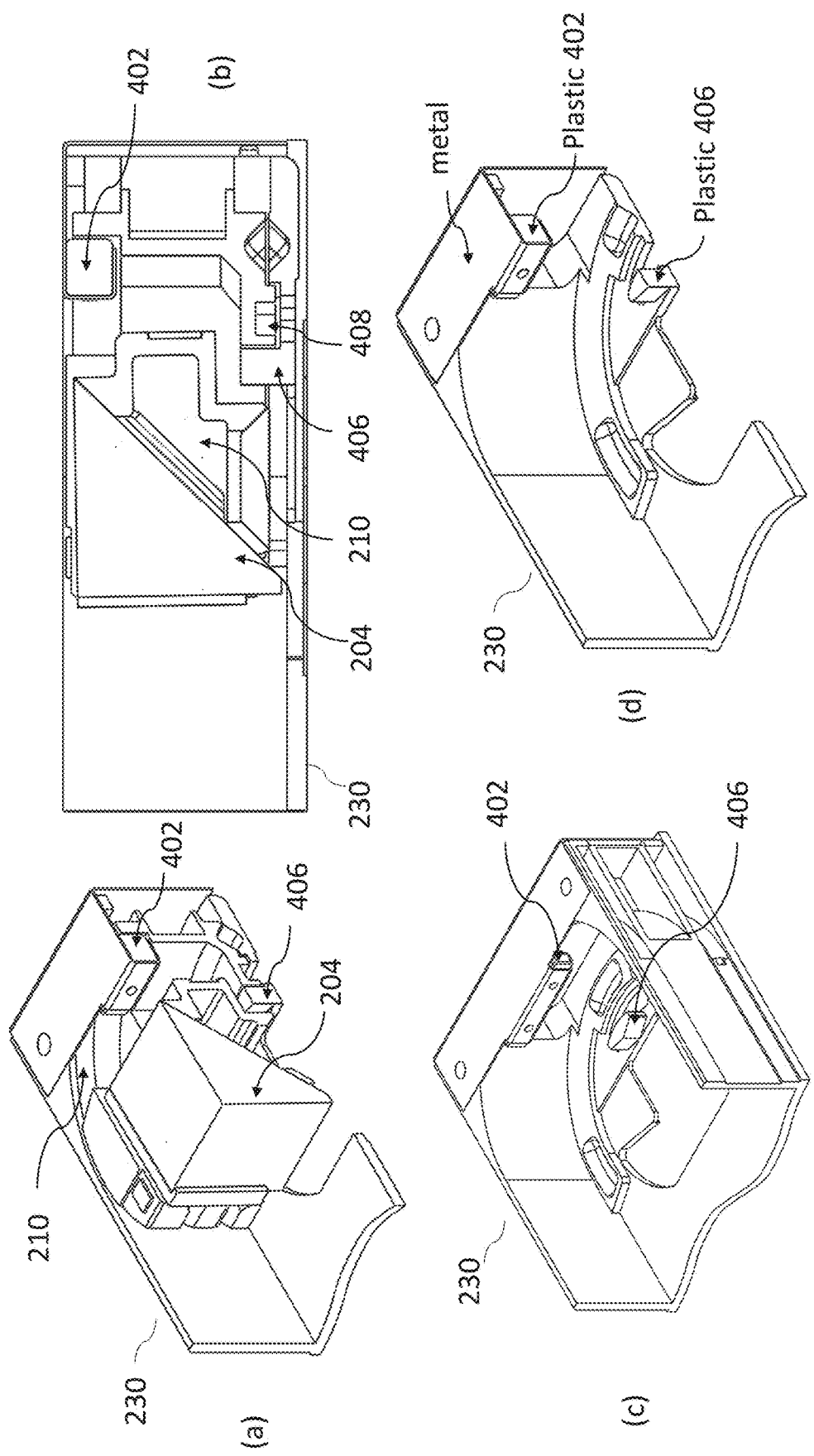
FIG. 4 shows various views with more details of parts of a yaw sub-assembly and a stationary sub-assembly of the OPFE actuator.

FIG. 4 shows various views with more details of parts of yaw sub-assembly 210 and stationary sub-assembly 230. Views (a) and (b) show cross sections through OPFE actuator 200, and views (c) and (d) show cross sections through stationary sub-assembly 230. As mentioned, yaw sub-assembly 210 is carried by stationary sub-assembly 230. OPFE actuator 200 further comprises a yaw stopping mechanism divided into a drop stopping mechanism and a rotation stopping mechanism. The drop stopping mechanism includes a drop stopper 402 that prevents yaw sub-assembly 210 from falling out of stationary sub-assembly 230 in case the OPFE actuator (or a device such as smartphone that includes the camera and actuator) is dropped. Exemplarily, stopper 402 may be made of plastic, while a part of stationary sub-assembly 230 in contact with stopper 402 may be made of metal. The rotation stopping mechanism includes a rotation stopper 406 that limits the rotation range of yaw sub-assembly 210. Exemplarily, rotation stopper 406 may be made of plastic, while a part of stationary sub-assembly 230 in contact with stopper 406 may be made of metal. In contrast, in PCT/IB2019/053315 there is only one metal stopper that performs all functions. The design disclosed herein is advantageous in that there are no plastic parts that may hit a metal if a device such as smartphone that includes the camera and actuator is dropped, or because of any other event that may create undesirable particles.

Yaw Rotation Position Sensing

Figure 5:
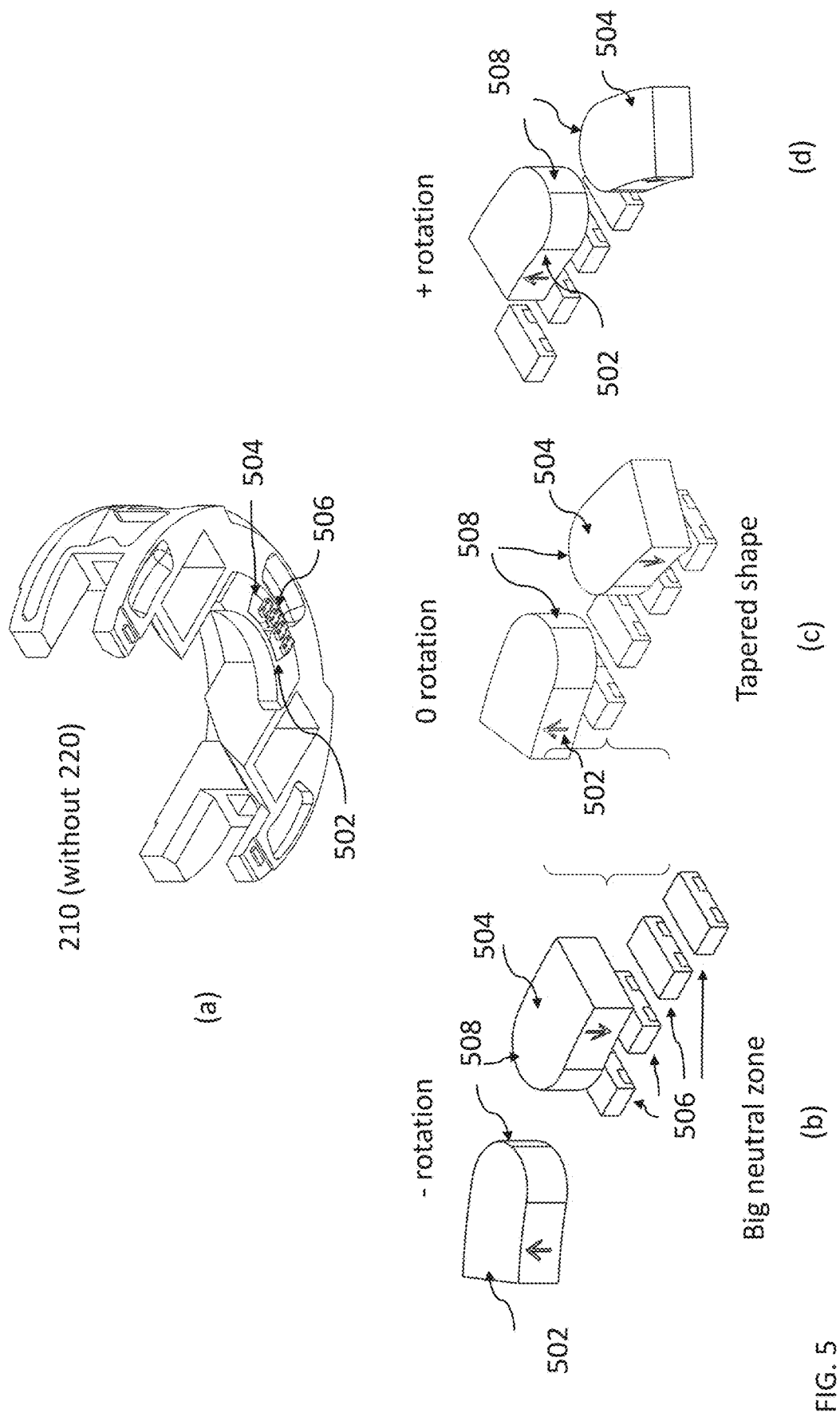
FIG. 5 shows in (a) yaw sub-assembly without the pitch sub-assembly and in (b), (c) and (d) details of yaw sensing magnets.

FIG. 5 shows in (a) yaw sub-assembly 210 without pitch sub-assembly 220 and in (b), (c) and (d) details of yaw sensing magnets 502 and 504 used for sensing yaw rotation position at 3 different yaw rotation positions. View (b) is at a negative rotation position, view (c) is at a zero rotation position and view (d) is at a positive rotation position. Magnets 502 and 504 are are fixedly coupled to yaw sub-assembly 210 and are flat, in contrast with magnets used for the same purpose in PCT/IB2019/053315, which are not flat. Flat magnets may be beneficial from a manufacturing or cost point of view. Flat yaw sensing magnets 502 and 504 have a tapered shape 508 to enable sensing with large movements. In some embodiments, only one yaw sensing magnet may be used.

The yaw sensing magnets may be combined with Hall effect bar sensors (or "Hall bars") 506 for rotation position sensing. Hall bar sensors 506 are fixedly coupled to stationary sub-assembly 230 and are placed beneath yaw sub-assembly 210 as shown in (d). In comparison to PCT/IB2019/053315, where the curved driving magnet was also sensing magnet, the driving mechanism and the sensing mechanism are separated here, allowing for a more precise sensing with lesser parts. The separation driving mechanism and the sensing mechanism allows for a large rotation radius (i.e. lever) for the driving force and a small rotation radius for sensing the rotation with higher precision.

Yaw sub-assembly embodiments disclosed herein may support a yaw rotation range of e.g. ±10 to ±35 degrees.

Pitch Rotation Position Sensing

Figure 6:
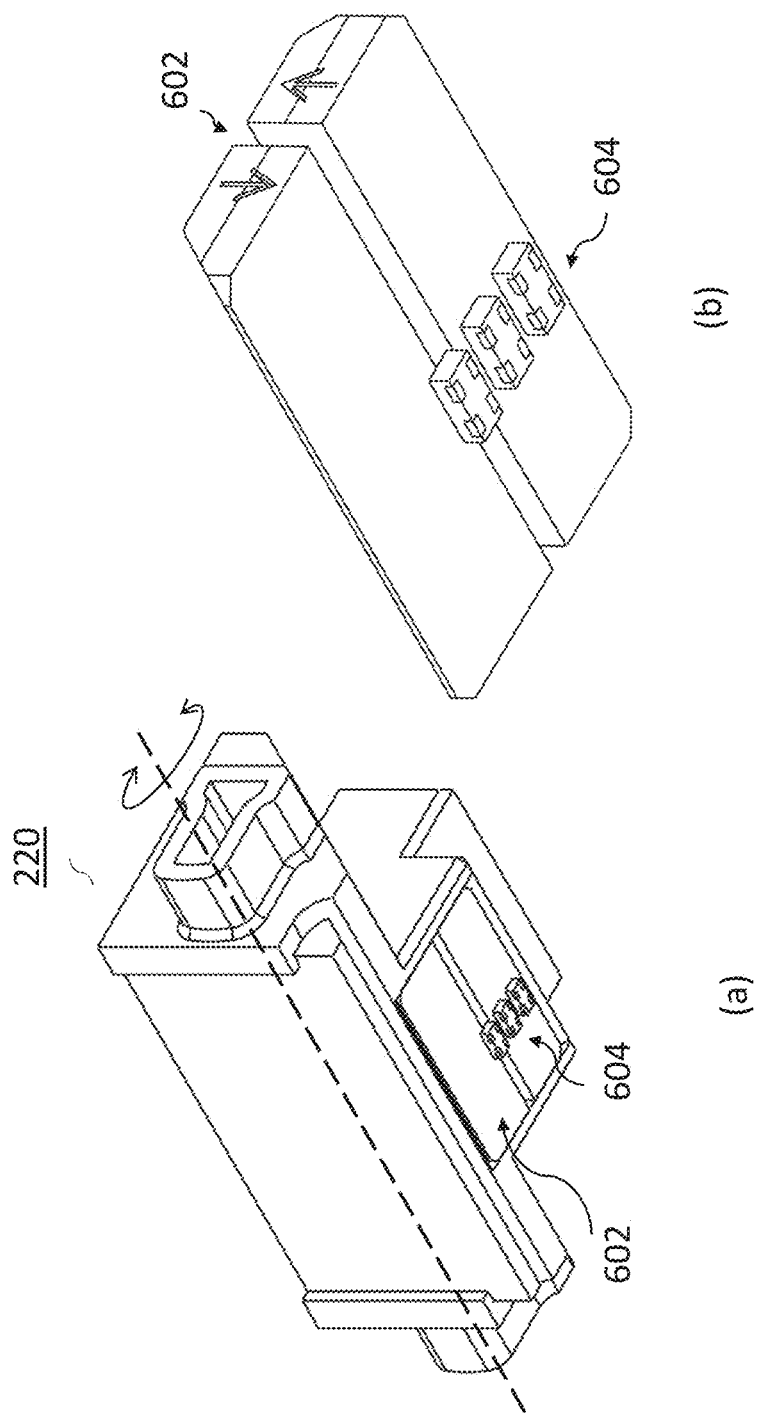
FIG. 6 shows the pitch sub-assembly including an exemplary magnet Hall bar arrangement.

FIG. 6 shows pitch sub-assembly 220 including an exemplary magnet Hall bar arrangement. Pitch driving and sensing magnets 602 are fixedly coupled to pitch sub-assembly 220, and pitch sensing Hall bars 604 are fixedly coupled to yaw sub-assembly 210. In each axis, multiple Hall sensors can be used to allow small rotations per A2D controller (driver) reading from the Hall bars and improve linearity of the sensing. In contrast, in PCT/IB2019/05331, a single Hall bar was used for each axis.

Pitch sub-assembly embodiments disclosed herein may support a pitch rotation range of e.g. ±2 to ±20 degrees.

Figure 7:
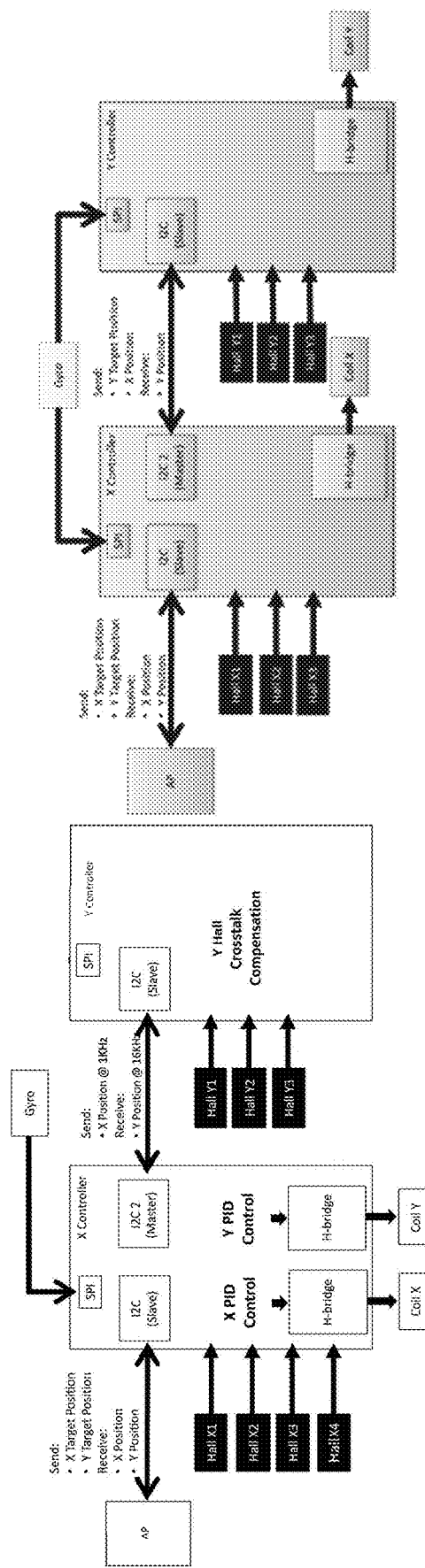
FIG. 7 shows details of two different embodiments using two controller/drivers used to control and drive various functions of the actuator.

FIG. 7 shows details of two different embodiments using two controller/drivers (a X (Yaw) and a Y (Pitch) controller) that receive inputs from e.g. a smartphone application processor (AP) and from an inertial sensor (e.g. a gyro) and provide currents to two coils of a driving mechanism (actuator). The pitch sub-assembly form a master-slave arrangement, wherein the yaw sub-assembly acts as the master and the pitch sub-assembly acts as the slave.

Figure 8:
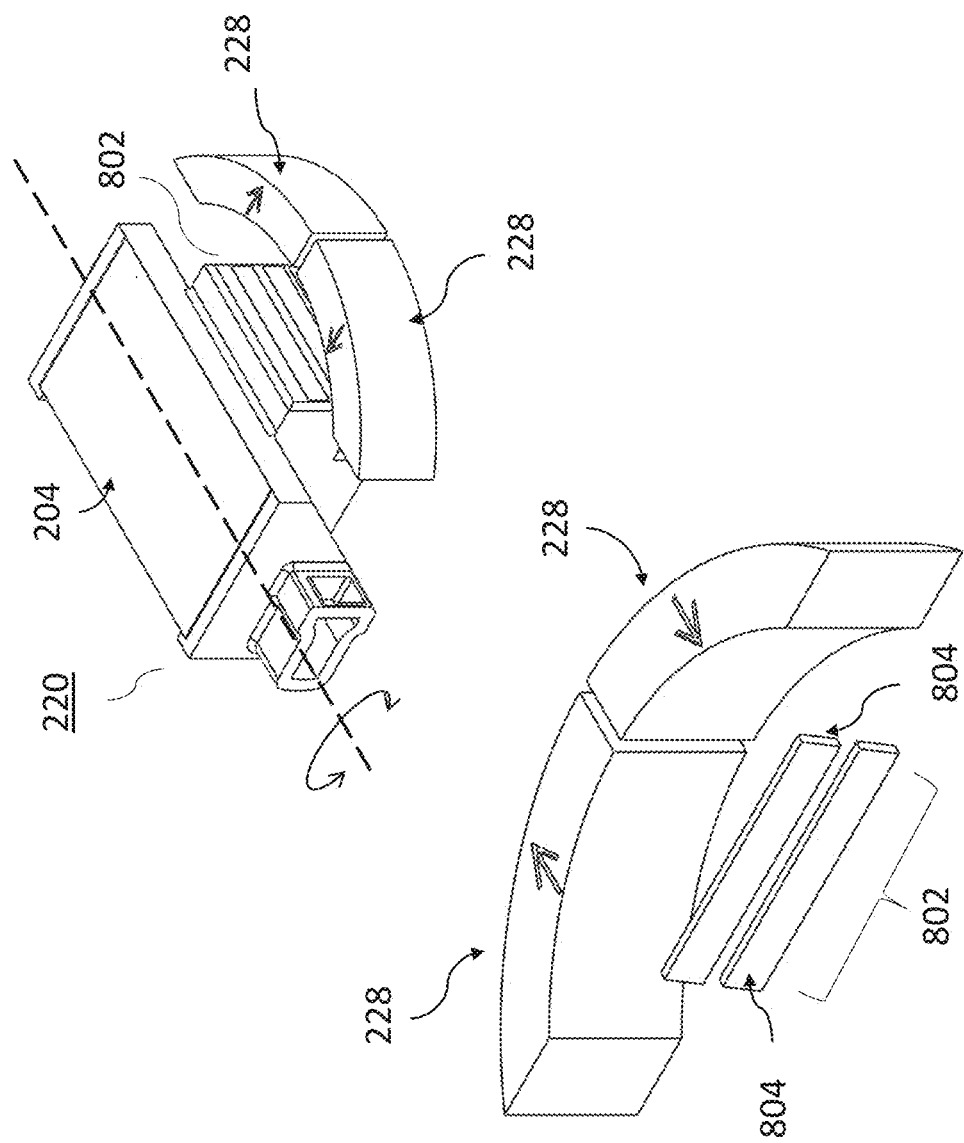
FIG. 8 shows the pitch sub-assembly and the yaw driving magnet.

FIG. 8 shows pitch sub-assembly 220 and yaw driving magnet 228. Yaw driving magnet 228 is also used as a pitch preload magnet. The "preload" is a force directed to attach pitch sub-assembly 220 to pivot rotation mechanism 232. A yoke assembly 802 including two yokes, yoke 804 and yoke 806, is attached to the pitch sub-assembly 220 to minimize a return torque/force and simplify the design. In some embodiments, the distance between yoke 804 and yoke 806 is used to define a return force. In other embodiments, the distance between yoke assembly 802 and yaw driving magnet 228 is used to define the return force. In an alternative embodiment, the pitch preload may use a single yoke.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An actuator, comprising:
   a yaw sub-assembly having a yaw rotation axis;
   a pitch sub-assembly carrying an optical path folding element (OPFE), the pitch sub-assembly including a pivot rotation mechanism and having a pitch rotation axis;
   a stationary sub-assembly; and
   a yaw driving magnet for driving the yaw rotation, wherein the yaw driving magnet is concentrically curved and—also preloads the pitch—sub-assembly to the pivot rotation mechanism,
   wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

2. The actuator of claim 1, wherein the actuator is integrated in a folded camera.

3. The actuator of claim 2, wherein the folded camera is a scanning Tele camera capable of scanning a scene in the two rotation directions.

4. The actuator of claim 1, wherein the yaw sub-assembly and the pitch sub-assembly form a master-slave arrangement, wherein the yaw sub-assembly acts as the master and the pitch sub-assembly acts as the slave.

5. The actuator of claim 1, wherein the pivot rotation mechanism includes a pivot located at two opposite sides of the OPFE and wherein the pitch rotation axis is close to a pitch sub-assembly center of gravity.

6. The actuator of claim 1, wherein the pivot rotation mechanism includes a pitch driving coil and a magnet.

7. The actuator of claim 6, wherein the pitch driving coil surrounds the yaw rotation axis.

8. The actuator of claim 1, wherein the yaw sub-assembly includes at least one groove-ball mechanism.

9. The actuator of claim 8, wherein grooves of the at least one groove-ball mechanism are concentrically curved, with a center of the curvature on the yaw rotation axis.

10. The actuator of claim 8, wherein balls of the at least one groove-ball mechanism are guided by groove pairs that include each a groove on the yaw sub-assembly and a groove on the stationary sub-assembly.

11. The actuator of claim 8, wherein the at least one groove-ball mechanism includes at least 3 balls.

12. The actuator of claim 8, wherein balls of the at least one groove-ball mechanism are located in a plane that is perpendicular to the yaw rotation axis.

13. The actuator of claim 1, wherein the yaw rotation is sensed by at least one Hall sensor.

14. The actuator of claim 13, wherein the least one Hall sensor is located beneath the yaw sub-assembly and is fixedly coupled to the stationary sub-assembly.

15. The actuator of claim 1, further comprising a yaw driving coil.

16. The actuator of claim 15, wherein the yaw driving magnet is fixedly coupled to the yaw sub-assembly and the driving coil is fixedly coupled to a housing.

17. The actuator of claim 1, wherein the yaw driving magnet has two different magnet polarization directions and wherein the two different polarization directions are perpendicular to the yaw rotation axis.

18. The actuator of claim 1, wherein the yaw rotation axis is close to a common center of mass of the yaw sub-assembly and the pitch sub-assembly together.

19. The actuator of claim 1, wherein the OPFE is a prism.

20. An actuator, comprising:
   a yaw sub-assembly having a yaw rotation axis;
   a pitch sub-assembly carrying an optical path folding element (OPFE), the pitch sub-assembly including a pivot rotation mechanism and having a pitch rotation axis;
   a stationary sub-assembly; and
   a yaw driving magnet for driving the yaw rotation, wherein the yaw driving magnet is curved, with a center of curvature close to the yaw rotation axis, and also preloads the pitch-subassembly to the pivot rotation mechanism,
   wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

* * * * *